US 7,469,238 B2

(12) United States Patent
Satchwell

(10) Patent No.: US 7,469,238 B2
(45) Date of Patent: Dec. 23, 2008

(54) METHOD OF RULE CONSTRAINED STATISTICAL PRICE FORMATION RECOGNITION

(75) Inventor: Christopher Satchwell, Warsash (GB)

(73) Assignee: Recognia Incorporated, Ontario (CA)

( * ) Notice: Subject to any disclaimer, the term of this patent is extended or adjusted under 35 U.S.C. 154(b) by 1504 days.

(21) Appl. No.: 10/316,015

(22) Filed: Dec. 11, 2002

(65) Prior Publication Data

US 2003/0139957 A1   Jul. 24, 2003

Related U.S. Application Data

(60) Provisional application No. 60/338,646, filed on Dec. 11, 2001.

(51) Int. Cl.
*G06F 17/00* (2006.01)

(52) U.S. Cl. ...................... 706/45; 705/36 R

(58) Field of Classification Search ............ 706/45; 705/36 R
See application file for complete search history.

(56) References Cited

U.S. PATENT DOCUMENTS

| 5,402,520 A | * | 3/1995 | Schnitta ...................... 706/16 |
| 5,412,769 A | * | 5/1995 | Maruoka et al. ............ 345/440 |
| 5,761,442 A | * | 6/1998 | Barr et al. .................. 705/36 R |

OTHER PUBLICATIONS

"Stock Price Pattern Recognition—A Recurrent Neural Network Approach", K. Kamijo, T. Tanigawa, Neural Networks, 1990, UJCNN, Intl Joint Conf, Jun. 1990, vol. 1, pp. 215-221.*
"Stock Price Pattern Matching System-Dynamic Programming Neural Network Approach", T. Tanigawa, K. Kamijo, Neural Networks, 1992, IJCNN, Intl Joint Conf, Jun. 1992, vol. 2, pp. 465-471.*
"Neural Networks for Technical Analysis: A Study on KLCI", J. Yao, C. L. Tan, H. Poh, International Journal of Theoretical and Applied Finance, vol. 2, No. 2, 1999, pp. 221-241.*
"Foundation of Technical Analysis: computational algorithms, statistical inference, and empirical implementation", A. W. Lo, H. Mamaysky, J. Wang, National Bureau of Economic Research, Mar. 2000.*

* cited by examiner

*Primary Examiner*—David R Vincent
*Assistant Examiner*—Mai T Tran
(74) *Attorney, Agent, or Firm*—Sughrue Mion, PLLC

(57) ABSTRACT

A method of developing a rule-constrained statistical pattern recognizer applicable to price formation recognition includes assembling input data containing examples of patterns to be recognized and establishing mandatory recognition rules. The recognition rules are programmed to construct an underspecified or underconstrained recognition model which is applied to the assembled data to produce candidate patterns. The candidate patterns are reviewed and identified as valid or invalid and for each pattern type a residual statistical model is produced based on the candidate patterns identified as valid. A filter is used to ensure that custom conditions such as duration relationships, height relationships and volume requirements are met.

17 Claims, 14 Drawing Sheets

METHOD OF RULE CONSTRAINED STATISTICAL PRICE FORMATION RECOGNITION

The present application claims priority from U.S. Provisional Patent Application No. 60/338,646, filed Dec. 11, 2001.

FIELD OF THE INVENTION

The present invention relates to financial analysis and particularly to price formation recognition.

BACKGROUND OF THE INVENTION

Numerous methods for recognizing patterns in data are known. See, e.g. Bishop, C. M. "Neural Networks for Pattern Recognition", Oxford University Press, 1995, ISBN 0-19-853864-2; Michie, D., Spiegeihalter, D. J., Taylor, C. C. "Machine Learning, Neural and Statistical Classification" Ellis Horwood, 1994, ISBN 0-13-106360-X; Ripley, B. D. "Pattern Recognition and Neural Networks", Cambridge University Press, 1996, ISBN 0-521-46086-7; and Webb, A. "Statistical Pattern Recognition" Arnold, 1999, ISBN 0-340-74164-3.

For the present purposes, these methods can be categorized into recognition methods for which (a) explicit rules are known and (b) rules are not known, but representative examples exist from which a mathematical relationship between causal input variables and some output variables can be derived. For the present purposes, a recognition algorithm of type (a) will be called rule-based and type (b) statistical.

The objective of a statistical recognition method is to produce a model, which can be applied to previously unseen inputs to classify the outcome correctly, without regard to compliance with explicit rules of any kind. In constructing such a model, there is an assumption that a meaningful (non-random) dependence exists between the input and output variables. There is often a further assumption that, for a given set of input variables, there may be more than one possible outcome. Such a model can still be useful if it correctly indicates a bias towards particular outcomes.

The output of these models is usually a set of numbers. These can be an attempt at calculating conditional probabilities (i.e. the probability of each outcome given the input variables) or simply an output-specific number, to be used in association with a threshold, above which the output is interpreted as being true. The choice of the threshold is usually dependent on the costs of misclassifications. Relaxing conditions needed to interpret results as conditional probabilities tends to produce better classification performance, meaning that the second type of model (unconstrained output-specific number) tends to classify better than the first.

An issue with statistical models is analogous to the interpretation of a sequence of noise-corrupted measurements into signal and noise components. If the model is to achieve its objective of correctly (or as near correctly as possible) classifying the outcomes of previously unseen data, it follows that unrepeatable fluctuations (noise), contained within the example set on which it is to be trained, must not be represented. In one way or another, this means that the complexity of a statistical model needs to be constrained so as to avoid modelling noise. Classically, this is achieved by dividing the data set into two parts, using one part to produce a number of models of systematically increasing complexity, examining errors associated with those models when applied to the unseen data set, and choosing the model complexity so as to minimise that error. There are a number of variations of this technique, which is known as cross-validation.

More recently, techniques have been developed (see, e.g. Bishop), which can reduce the output curvature of over-complicated models so as to maximize the inference (i.e. optimise the signal/noise decomposition) that can be drawn from a data set. The process of restricting output curvature is known as regularisation. These techniques have the advantage of producing models of optimal complexity for whatever data set is available, which makes them particularly useful when little data exists. In consequence, these methods are appropriate for recognition problems where either the recognition rules are not known, or for modelling a consensus view of experts who disagree about what the recognition rules should be.

The objective of rule-based recognition methods is to produce a model, which can be applied to previously unseen inputs to predict an outcome correctly, and comply with rules, which alone are sufficient for recognition.

Within computer science literature, these models are known as classical artificial intelligence. Typically, a knowledge engineer will elicit appropriate rules from an expert and program them. Such recognition methods are wholly deterministic and, unlike statistical recognition methods, do not encompass uncertainty. Neither do they encompass the idea of optimal inference from a noisy data set. They are appropriate therefore for situations that lack any differences of opinion and for which a clearly identifiable rule set is wholly adequate for recognition. There is a category of rule based problems that can be solved by rules e.g. whether or not well-defined criteria are satisfied so that a job application can move on to the next stage.

There is another category of problems that cannot easily be solved by rules and instead are addressed using statistical models. These problems include many medical problems, where the broad experience of a doctor has to be drawn on to reach a diagnosis. Often, it is the case that rules may very well be capable of being used with these problems but nobody knows what they are. The result is that a knowledge of the outcomes from similar instances to some present problem is used as a basis for a decision.

There may be an element of interpolation in this type of decision-making process, but essentially it draws on a base of known examples, believed to be relevant to a problem of interest. Given enough examples, multivariate statistical models can be built to replicate this type of decision-making process. These do not claim to know what the rules are, they simply claim to be a mathematical representation of the data (i.e. previous decisions and the factors they were based on), but are useful because they can encapsulate the experience that a professional, like a doctor, can build up over a working lifetime. They also have the additional advantage that they can process unlimited numbers of examples to encapsulate the experience of a whole generation of doctors if data is available.

Technical financial analysis (or just technical analysis), as opposed to fundamental analysis, uses the past price, volume activity, or other measures of a stock, or of a market as a whole, to predict the future direction of the stock or market. The results of technical analysis (sometimes also referred to as "charting") are usually shown on charts or graphs that are studied by technicians to identify known trends and patterns in the data to forecast future performance.

A number of terms of art are used in the present specification. An inbound trend is a series of higher highs or lower lows that lead into a price pattern. An indicator is a calculation based on stock price and/or volume that produces a number in the same unit as price. An example of an indicator is the moving average of a stock price. An oscillator is a calculation based on stock price and/or volume that produces a number within a range. An example of an indicator is the moving average convergence/divergence (MACD). A price chart is a graph of a company's share price (Y-axis) plotted against units of time (X-axis).

The terms technical event, and fundamental event are coined terms to denote points such as the price crossing the moving average or the MACD crossing the zero-line. The technical event or fundamental event occurs at a specific point in time. The importance of most indicators and most oscillators can be represented as technical events. A technical event, as used herein, is the point in time where a stock price has interacted (e.g. crossed or bounced) with an indicator or a price pattern or an oscillator has crossed a threshold. There are other techniques that technical analysts use to interpret price history as well that can be represented as technical events. These, however, are more subjective and involve the subjective recognition of price formations or price patterns. Fundamental events are the point in time where a stock price has interacted (e.g. crossed or bounced) with a price value computed from company accounting and/or other economic data.

A price formation, price pattern or chart pattern is a pattern that indicates changes in the supply and demand for a stock cause prices to rise and fall. Over periods of time, these changes often cause visual patterns to appear in price charts. Predictable price movements often occur follow price patterns. A reversal pattern is a type of price pattern that is believed to indicated a change in the direction of a price trend. If prices are trending down then a reversal pattern will be bullish since its appearance is believed to indicate prices will move higher. Examples of bullish reversal patterns include double bottoms and head and shoulder bottoms. Similarly, if prices are trending up then a reversal pattern will be bearish. Examples of bearish reversal patterns include double tops and head and shoulder tops.

Traditionally, the approach to technical analysis is a manual one. One important aspect of technical analysis is pattern recognition in which price information for a period of time is graphed or plotted on a Cartesian coordinate system to facilitate visual recognition of established patterns. A manual approach to charting can be unreliable because it depends on human pattern recognition ability. It can be error prone due to guesswork, inaccurate heuristics or the absence of a systematic procedure for comparing the available data with all possible or likely formations. In addition, if the analyst has a predilection for certain formations, the results may be biased towards those formations and may not be as accurate as an unbiased approach. Finally, a manual approach, even with the aid of mechanical or computer assistance is inherently slow due to the human factor.

A recent innovation in technical analysis is the use of neural networks to recognize patterns in the financial data. However, training neural networks to recognize patterns, or formations, in financial results is cumbersome and highly dependent on the quality of data used to train the neural network.

One well-known technique in technical analysis is point and figure charting. In point and figure charting, the price of, for example, a stock is plotted as columns of rising Xs and falling Os to denote price movement greater than, or equal to, a threshold amount, denoted a box size. Unlike other charting methods, such as open, high, low, close (OHLC), bar or candlestick, where price action is plotted according to time, point and figure charting is more time independent and price, not time, dictates how point and figure charts take shape. For example, a series of volatile trading sessions over the course of a week could fill an entire page or screen in a point and figure chart, whereas a month of inactivity or static range trading might not be reflected on the chart, depending on the chosen box size. The box size determines how much background "noise" is removed from the price action, and, hence, the granularity of the resulting chart. The factors that typically influence the choice of box size include volatility and the time horizon being examined.

The technique of conventional point and figure charting is described in detail in Kaufman, P. J. "Trading Systems and Methods" ISBN 0-413-14879-2, John Wiley & Sons 1996. In summary, a box size, datum price and datum time, are chosen. If a new high exceeds the sum of the current datum plus a box size, a 'X' is written in a column and the datum price shifted to the datum plus box size. When the market reverses by more than some multiple of the box size, a column of Os is formed, and continues in a similar manner until the market reverses by more that the prescribed multiple of box sizes. The chart can be based on tick by tick results, or on the OHLC data. In conventional point and figure charting, the use of OHLC data can introduce ambiguity into the charting process, as a large price differentials between high and low in a single day can occur, potentially resulting in a reversal in both directions without it being clear whether the high or low occurred first.

One attractive feature of point and figure charting is the fact that conventionally accepted chart formations, such as double tops and triangles, can be clearly identified. Buy signals can be generated when prices surpass a previous bottom pivot point by one or more boxes, and the reverse for sell signals. This eliminates much of the subjectivity of other analysis techniques. However, point and figure charting is highly dependent on the box size chosen, and relevant formations can be missed if the box size is not appropriate. Some points to note are: (1) point and figure charting conventionally works forwards from a datum rather than backwards from the end of the series. This means that the sequence of X's and O's required to generate a trading pattern depends on the date and price used to start the sequence—which usually results in delayed pattern completion dates, depending on how fortunate the choice of origin was (2) the intention is to produce a chart using a fixed box size, from which a formation will hopefully be recognised visually; (3) the box size acts as a filter, in that small fluctuations in value do not trigger the creation of either a new 'X' or 'O', but large fluctuations do; and (4) point and figure charts are independent of time, but to create a zig-zag line, time is required. Products available for automating point and figure charting suffer similar disadvantages.

An alternative method is the use of pivot points in the technical analysis of a time series. The time series can include time series of financial data, such as stock prices, medical data, electrocardiogram results, or any other data that can be presented as a time series, and in which it is desirable to identify turning points, trends, formations or other information. The method of pivot points uses a modified point and figure technique to determine the pivot, or turning points, and categorizes them according to the box size at which they appear, while associating time, or lag, information with each identified point. A method of pivot point characterization in technical analysis, and a method for using the characterized pivot points for price formation recognition, are described in U.S. patent application Ser. No. 10/245,240 and U.S. patent application Ser. No. 10/245,263, both filed Sep. 17, 2002, the contents of which are incorporated herein by reference.

Price formations used by traders can, in part be defined by specifications. Using specifications alone, it is difficult, if not impossible, to achieve consistent recognition of formations to satisfy a consensus of traders. There is a category of problems for which experience offers better solutions than rule-driven specifications. To try to devise perfect rules to recognize trading formations may be successful for a few carefully chosen examples, but the resulting recognition method would be likely to perform poorly on a random selection of previously unseen formations—the reason being that a generic recognition rule set cannot easily be identified and may not even exist for this type of problem. It is, therefore, desirable to provide a recognition model that has adequate complexity to recognize formations in general.

SUMMARY OF THE INVENTION

It is an object of the present invention to obviate or mitigate at least one disadvantage of previous methods associated with known methods of formation recognition. The present invention comprises a hybrid formation recognition method. If recognition specifications are deliberately kept loose, i.e. the problem is under specified, formations will contain a large number of false positives but likely encompass all the true positives. Traders' opinions of those formations and prior (price) development can now be sought and used to: decide what additional information is needed to refine the recognition process; and provide targets for a statistical model of appropriate complexity to replicate their consensus.

In a first aspect, the present invention provides a method of developing a rule-constrained statistical pattern recognizer applicable to price formation recognition which includes assembling input data containing examples of patterns to be recognized and establishing mandatory recognition rules. The recognition rules are programmed to construct an under specified or under constrained recognition model which is applied to the assembled data to produce candidate patterns. The candidate patterns are reviewed and identified as valid or invalid and for each pattern type a residual statistical model is produced based on the candidate patterns identified as valid. Additionally, a filter can be used to ensure that custom conditions such as duration relationships, height relationships and volume requirements are met.

The present invention is particularly suitable for formation recognition because it guarantees that a minimal rule set will be observed for any formation. Unlike formations recognized solely by statistical models, this means that a formation can be dismissed because some "mandatory" rule is violated.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Embodiments of the present invention will now be described, by way of example only, with reference to the attached drawings, wherein.

DETAILED DESCRIPTION

Figure 1:
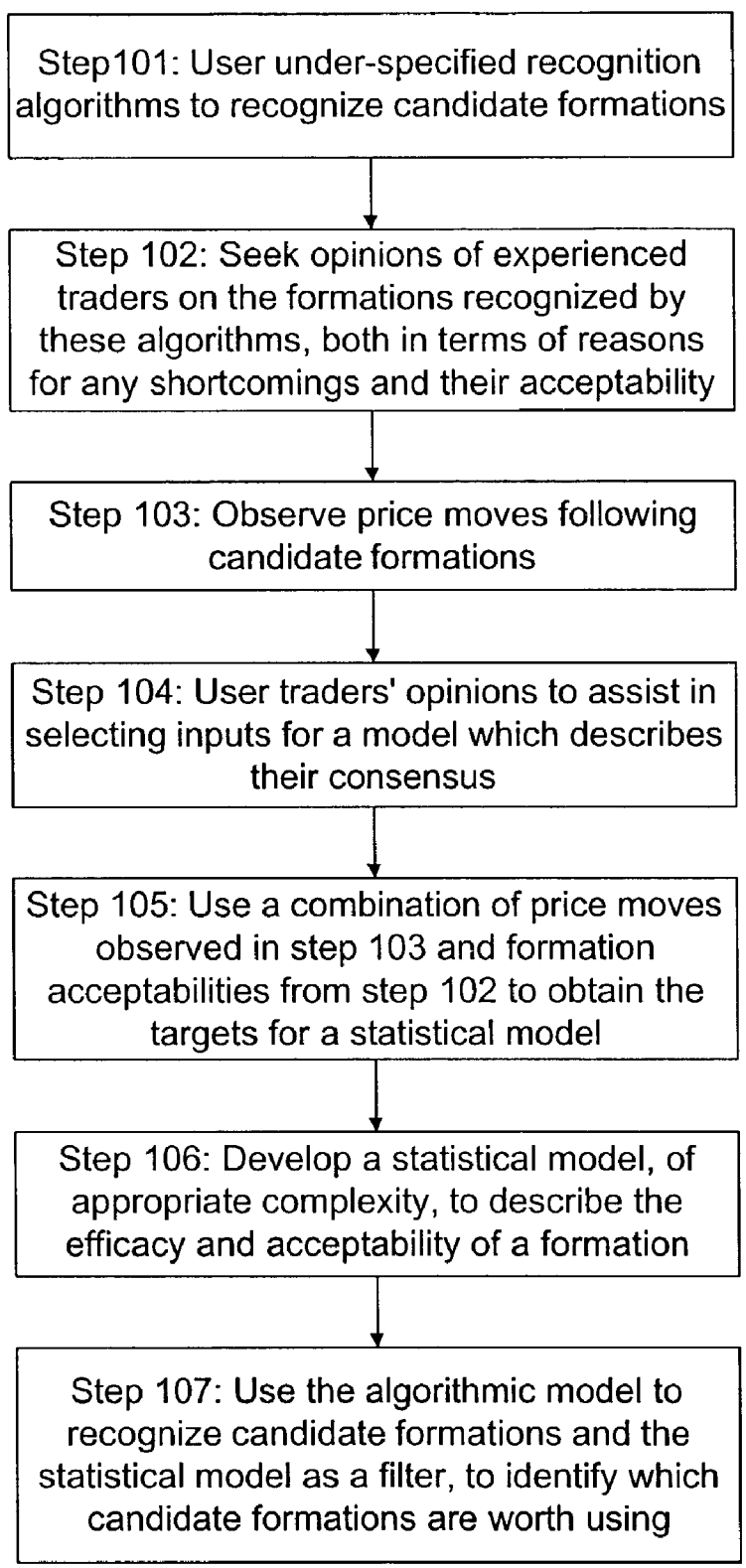
FIG. 1 illustrates a method according to an embodiment of the present invention.

Generally, the present invention provides a system for and a method of rule constrained statistical pattern recognition applicable (RCSPR), for example to price formation recognition. Specifically, the present invention is directed to the recognition of general formations of a given type rather than highly-specific formations of the same type that could be recognized using algorithms with many more rules.

Primary elements of the present invention include applying a minimalist rule-based model, with the intention of narrowing the search space, guaranteeing that mandatory rules are met with the possibility of generating useful features for a follow-on statistical model to describe any shades of grey. Circumstances where the technique looks useful are decisions involving quantifiable data, rules and judgement. The addition of customisation, or filters, described below is also useful, particularly so when dealing with a users who have strongly held, but differing, views.

The method of the present invention differs from the application of conventional technologies such as a search engine. Certain aspects of the present invention are analogous, for example, to a search engine which is capable of either a broad (loose) or a narrow (fine) search. This is similar to the concept of a recognition process of the present invention. The big difference is that with a search engine, the same algorithm is used for both fine and narrow searches, whereas with the present invention finer recognition is only achieved by changing an algorithm through the addition of more rules.

With respect to rules for formations, individual technical analysts tend to have discovered their own heuristics that work for them. These can be fiercely defended, and result in a situation where the technical analysts might agree on a core set of rules, but have their own ideas as to what additional rules constitute a formation. This suggests that there are a number of advantages in using rules wherever they are generally agreed upon and trying to model a consensus of technical analysts' opinions wherever not. Such rules are elicited from experts and applied to price records to obtain candidate examples of the type of formation sought. Candidate formations are then submitted to experts to be labelled as good or bad, to provide examples for the subsequent statistical model. From a recognition point of view, this means that the statistical model only has to decide if a candidate formation is a good or bad example of the type being sought.

Mathematically, this means that the search space is narrowed from an arbitrary price record, to a price record of a specific length in which a candidate formation is known to exist. The search space can be narrowed further by the availability of features (from the rule-based model) that are relevant to the final recognition of candidate formation in question.

The process of recognizing candidate formations via rules also generates features (e.g. prices and timings of formation vertices, volume patterns etc.). These can be used to define a highly relevant input space for a statistical model to reflect technical analysts' opinions about the validity of formations. The result is that the statistical model has to address the question "given a specific candidate formation with known features, is this a good or bad example?" By contrast, a pure neural net model has to address the questions "given a price/volume record, are there any formations in it, if so of what type and where?" The former question, in combination with the relevant input space, is a much easier statistical recognition task than the latter. The technique of the present invention has therefore transformed a difficult statistical recognition task into an easier one with prospects of much improved results.

The method of the present invention also differs from the concept of a statistical model, in that the present invention includes a specific, identifiable rule set, derived from a human expert and capable of being described by a flow chart and programmed into a computer. By contrast, a neural net is a statistical model, relating inputs to outputs, where the relationship is a representation of the input/output examples upon which it has been trained. Expert-derived explanatory rules are absent. An example of "training" is that of calculating the constants for a linear regression. The neural net, therefore, requires both examples and a training process, and is a representation of experience. Of course there are many possible mathematical forms of neural network and we have illustrated a conceptual difference by referring to ones that relate inputs to outputs.

The rule-constrained statistical pattern recognition method of the present invention can be used to produce a model, which can be applied to previously unseen inputs, to classify the outcome correctly, and guarantee that every positive classification will comply with a core set of rules, which alone are inadequate for recognition in all cases. This hybrid situation can arise where a core set of rules is available and then there is either ignorance or disagreement about the step between compliance with the core rules and recognizing the pattern. In such cases, statistical recognition methods are unreliable since they cannot guarantee compliance with a core set of rules. Similarly, rule-based methods can, at best, only model an individual expert's opinion rather than the broad consensus of many experts who have differing ideas about non-core rules or who may not be too sure what they are. For these situations, there can be considerable and non-obvious advantages in adopting a hybrid approach to recognition.

The method generally comprises loosely specifying algorithms for formation recognition, recognizing candidate formations, and applying a statistical model to rate the identified candidate formations. The method for determining a statistical model for rating candidate formations, according to the present invention, is generally shown in the flowchart of FIG. 1. At step 101 a user under-specifies, or loosely specifies, recognition algorithms to recognize candidate formations. At step 102, the opinions of expert traders are sought to rate the formations recognized by the under-specified recognition algorithms, and to rate their acceptability and their shortcomings. At step 103, the price movement following recognized candidate formations are observed. Next at step 104, the experts' opinions are used to select inputs for a consensus model. Using a combination of observed price movement and formation acceptability, targets for a statistical model are obtained (step 105), and the statistical model is developed (step 106). In accordance with the present invention, under-specified algorithms are then used (step 107) to recognize candidate formations and the developed statistical model is used as a filter.

The formation recognition algorithms of the present invention are "loosely specified" in the sense that they implement algorithms having a minimum set of rules, which, when applied, are capable of recognizing generic examples of a type but are insufficient to recognize specific varieties of the same type. Accordingly, the recognition problems are formulated so that they are under-constrained or under-specified with the intention that all true positives will be included in formation recognition at the price of the inclusion of false positives.

Figure 2:
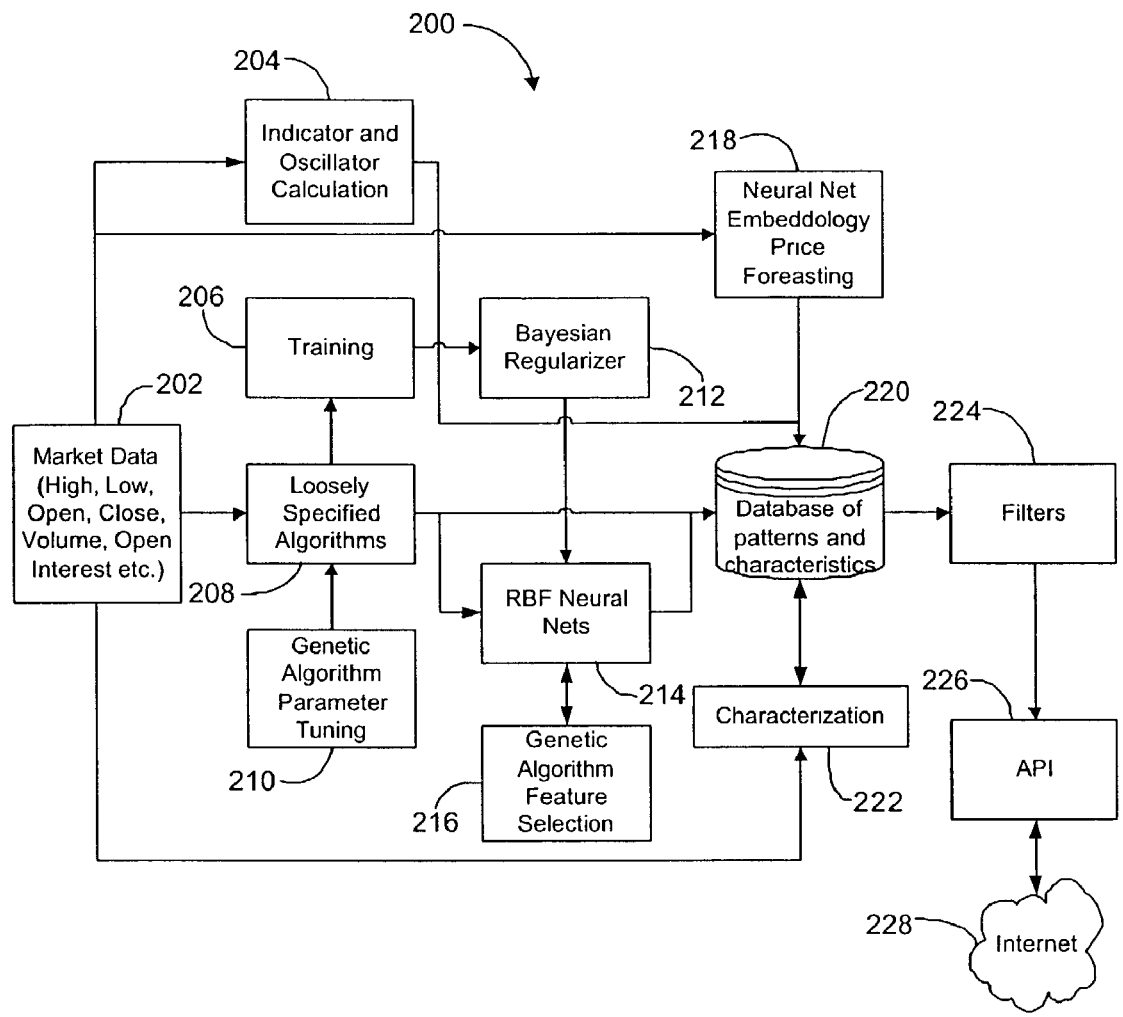
FIG. 2 illustrates a system according to a second embodiment of the present invention.

FIG. 2 is a block diagram of a system 200, according to an embodiment of the present invention. System 200 consists of a number of interconnected modules, typically embodied as software modules. Market data module 202 provides, for example, daily stock market information such as high price, low price, open price, close price, volume, open interest and tick data values for stocks. The market data can be downloaded on a continuous, real-time basis directly from stock market providers, or can be sampled on a periodic basis, such as daily. The market data can include data for a whole market, or data related to certain identified stocks. Market data module 202 feeds the market data to a loosely specified algorithm (LSA) module 208, which identifies candidate patterns at different window sizes. The identified candidate formations are written into a database 220 for further analysis. The LSA module 208 can also generate chart markup and annotation. Market data module 202 is also feeds the market data to indicator and oscillator calculation module 204, a neural net embeddology price forecasting unit 218, and characterization module 222.

The calculation engine 204 computes time series, such as simple moving averages and relative strength indicator (RSI) oscillator values, and writes the calculated values into the database 220. These are technical analysis calculations that are used to identify technical events. An example of a technical event is a closing price moving above its 200 day moving average. Another example is an RSI moving above 70.

The neural net embeddology price forecasting module 218 provides a further characteristic of a pattern. The price forecast indicates the expected price at some future time. These price forecasts are also written to the database 220. Embeddology price forecasting produces a series forecast of prices forward in time that are statistically independent of patterns and technical events, as is known to those of skill in the art. This information is compared to the conventional price prediction determined by the geometry of the pattern. Other oscillators, such as relative strength, could also be used to support or deny the price movement predicted by the pattern.

The LSA module 208 is tuned by parameter tuning a genetic algorithms in a genetic algorithm module 210. This is a periodic training activity. Genetic algorithms are used to select and weight the various parameters and rules used by the LSA module 208 to find candidate patterns. Candidate patterns recognized by the LSA module 208 can also be ranked by human experts as a periodic training activity. In this case, candidate patterns are shown to human experts who then rank this information based on their experience. This information is stored in training module 206. The information from the training module 206 is used by the Bayesian regularizer module 212. The Bayesian regularizer module 212 is a training file that is used to periodically update radial basis function (RBF) neural net module 214. The RBF neural net module 214 receives candidate patterns from the LSA module 208 and the RBF neural net module 214 determines an experiential rating for each candidate pattern. The experiential rating is, preferably, equivalent to the rating a human expert would give to the candidate pattern.

Genetic selection feature algorithm module 216 tunes the RBF neural net module 214. Again, this is a training activity that is performed periodically. RBF neural net ratings are also written to database 220. This is a number that indicates how a human expert would rate the candidate pattern.

The characterization engine 222 computes various characteristics for every candidate pattern found by the LSA module 208. The characterization engine 222 reads candidate patterns, indicators and oscillators from database 220, computes pattern and event characteristics and write results back to database 220. An example characteristic is the symmetry number. Symmetry is a measure of the similarity of the two halves of a pattern. For example, with a head and shoulder pattern, the symmetry number tells you how balanced the head is and how similar the left and right shoulders are to each other.

Patterns and event information, and characteristics are passed to filter 224 that screens output based on defined criteria. These can be supplied by the financial content provider who administers the system 200 or by a client such as a financial service provider or consumer. A filter 224 is defined for each user of the system 200. Filters 224 restrict the patterns passed out of the system 200 to ensure that patterns delivered meet certain minimum thresholds. For example a filter may specify that only patterns of a high symmetry number are to be passed.

External calls (by a customer or external user) to the system 200 are managed by API 226 which interprets and executes the external command. The API 226 receives calls from outside world and returns result of calls. Interaction with the outside world is controlled by the API 226, for example through an internet, such as the Internet 228. The API 226 accepts calls from the outside world, passes the command to the internal system then returns the result in a requested format (e.g. XML, SOAP, EXCEL, WORD). The application programming interface API 226 makes the data available to the client side by accessing the database 220 through filters 224. On the client side, an application such as a financial service provider application can be used to communicate with the server side API and provide an interface, preferably a graphical user interface (GUI) for example, to consumers who access the financial service provider application.

As will be apparent to those of skill in the art, the various training modules, such as the training module, genetic algorithm parameter tuning module, genetic algorithm feature selection module, and Bayesian regularizer module, can be excluded. In this case, the LSA module 208 and the RBF neural net module 214 are not periodically trained, and are instead provided with static algorithmic and statistical models.

Figure 3:
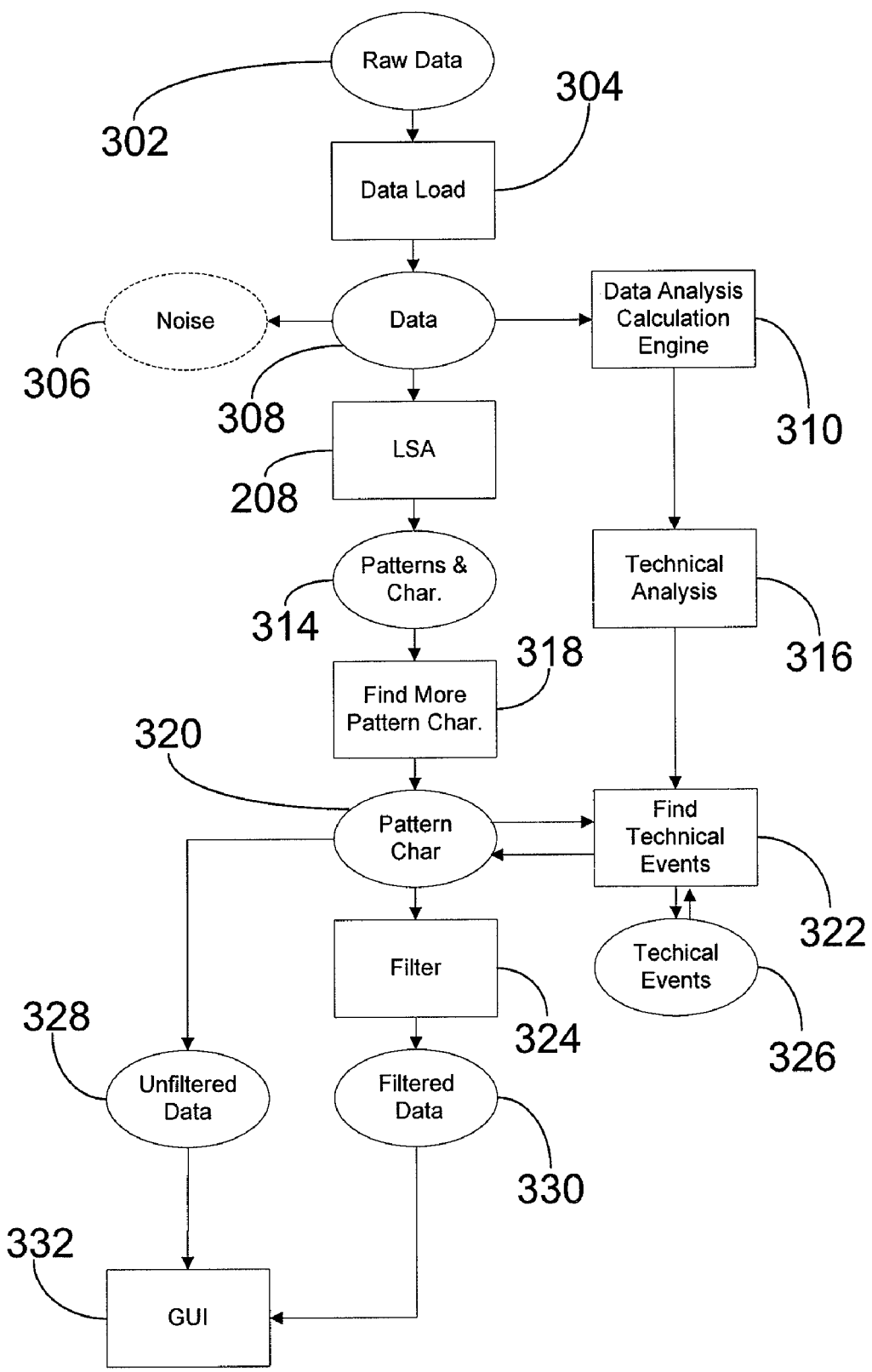
FIG. 3 illustrates a system showing data flow according to the present invention.

FIG. 3 shows a data flow diagram according to an embodiment of the present invention. The system of the present invention has been abstracted from the systems described above. Raw data 302, such as raw market data, is loaded into the data module 304. The raw data is separated into data 308 and noise 306. The data 308 is passed to a data analysis calculation module 310, a technical analysis module 316. The data 308 is also passed to a loosely specified algorithm (LSA) module 208 to identify candidate patterns and characteristics 314. Additional pattern characteristics are found by a subsidiary process 318. The resulting patterns and characteristics 320, along with the technical analysis results are fed to a technical event identification module 322 to generate technical events 326. The patterns are also fed to a filter 324 to produce filtered data 330 which can be modified and manipulated to a useful form (product) suitable for presentation to users, for example by employing a graphical user interface (GUI) 332. The unfiltered data 328 can also be presented to the user via the GUI 332.

Figure 4:
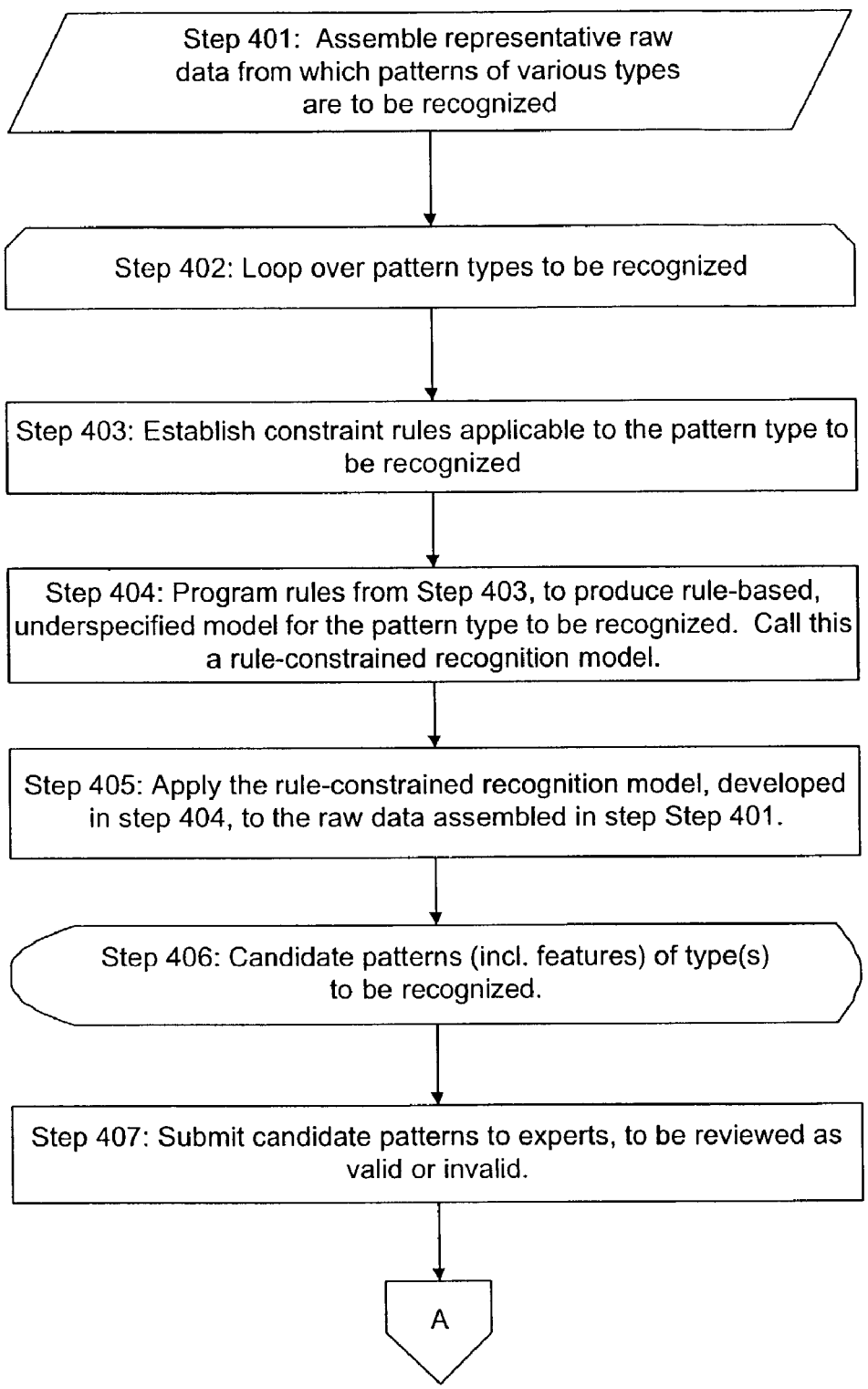
FIGS. 4 and 5 illustrate the embodiment of FIG. 1 in greater detail showing a flow chart for the development of a rule-constrained statistical pattern recognizer.
Figure 5:
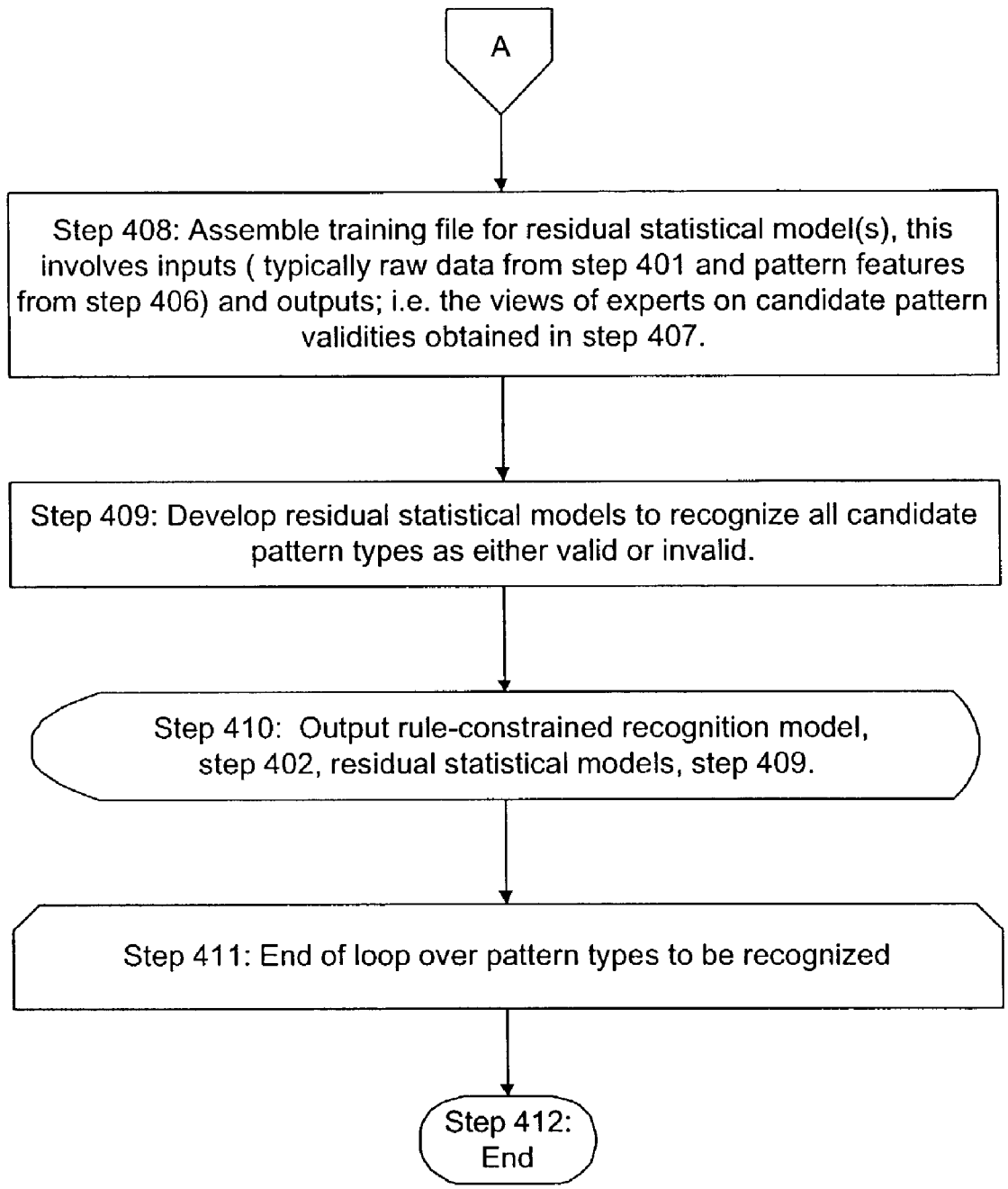

FIGS. 4 and 5 elaborate on the method of FIG. 1. With reference to the flow chart of FIGS. 4 and 5, the steps in developing a rule-constrained statistical pattern recognizer are:

Step 401. Assemble data for an input space that is representative of a region within which a significant number of examples of each pattern type that need to be recognized can be found, and within which the recognition model is to be used.

Step 402. Steps 403 to 411 are then carried out for each pattern type that needs to be recognized.

Step 403. Establish the mandatory rules. This can be done by consulting a group of experts and eliciting from them all those recognition rules that they regard as mandatory. Mandatory rules from the experts can then be compared. Those that are sufficiently common can be used to form the mandatory rule set for an RCSPR model. It is important to note that such a rule set must under specify the recognition problem so as to leave an element of the recognition problem for meaningful statistical analysis.

Step 404. The mandatory rules are programmed to form an under specified rule-based recognition model. This will be termed the rule-constrained recognition model.

Step 405. The rule-constrained recognition model is applied to a raw (input) data set that is representative of the input space to be used for later recognition.

Step 406. The result of carrying out step 405 should be to generate a number of candidate patterns of the type to be recognized, that may include many false positives but, as far as possible, exclude false negatives. The rule constrained recognition model is 100% deterministic and will therefore let through all those candidate patterns that satisfy its rules. Its deterministic nature means that no candidate it produces can be a false negative.

Step 407. The candidate patterns recognized in step 405 are then shown to experts who are invited to label them as either valid or invalid and make any comments they feel appropriate. This produces a labelled data set for later use in a residual statistical model to assess the validities of candidate patterns of possible types. Typically, the numeric coding will be zero for an invalid pattern and one for a valid pattern.

Step 408. In addition to the target data obtained from step 407, input data also needs to be obtained. Comments about candidate pattern features obtained from step 407 provide guidance as to which are likely to provide useful inputs. In general inputs will include such features and also elements of the raw input data. There are no hard and fast rules for feature selection and a discussion on this subject can be found in Webb(pp 215-225).

Step 409. For each possible pattern type, a complexity-optimized statistical recognition model for validity is produced. This will be termed the residual statistical model. Typically it is generated using known methods. (See, e.g., Bishop; Michie et al.; Ripley; and Webb).

Step 410. The output of this model-generation process is two-fold: a rule-constrained statistical model to identify candidate pattern features; and a residual statistical model to assess the validities of those patterns.

Step 411. This is the point where the loop over pattern types ends.

Step 412. At this point, the method ends.

One further step remains, which is the choice of threshold to be used in the interpretation of the outputs of the residual statistical recognition models. There was earlier comment on this point regarding misclassification costs that is relevant here. The general approach is to use the models on some data, examine the outputs, keep in mind the earlier comment, and then assess appropriate values of thresholds and also feasibility limits if needed. More sophisticated ideas on thresholds, such as receiver operator characteristics, can be introduced if needed.

There are a number of important points to note. Firstly, candidate patterns have features, which may provide a highly relevant source of inputs for the residual statistical model. Secondly, the recognition problem may involve the classification of many possible types of patterns from the raw input data. A classical statistical recognition model would be likely to produce many similar outputs for the different possible pattern types, creating uncertainty in their interpretation. Rules in the rule-constrained statistical pattern recognition approach can be framed to ensure that, when positive, there is always a unique candidate for each pattern type, simplifying the subsequent statistical pattern recognition problem by reducing it to two alternatives: valid or invalid. Even when rules can result in non-exclusive outputs, the chances of all possible patterns being candidates are usually very small. This simplifies the interpretation of rule-constrained statistical pattern recognition outputs compared to classical statistical models.

The net result is to ensure compliance with rules, simplify the residual statistical recognition problem (compared with the classical approach) and possibly generate a rich feature set to provide high-performing inputs for residual statistical recognition model. Since the final part of the recognition problem is statistical, it also follows that principled methods to optimize model complexity (i.e. methods that draw the best inference from noisy data) can be advantageously applied.

Such a model could not be reliably produced using either the rule-based approach or statistical approach in isolation. The rule-based approach could not be properly optimized nor account for rules that are not known and the classical statistical approach does not comply with rules of any kind.

Figure 6:
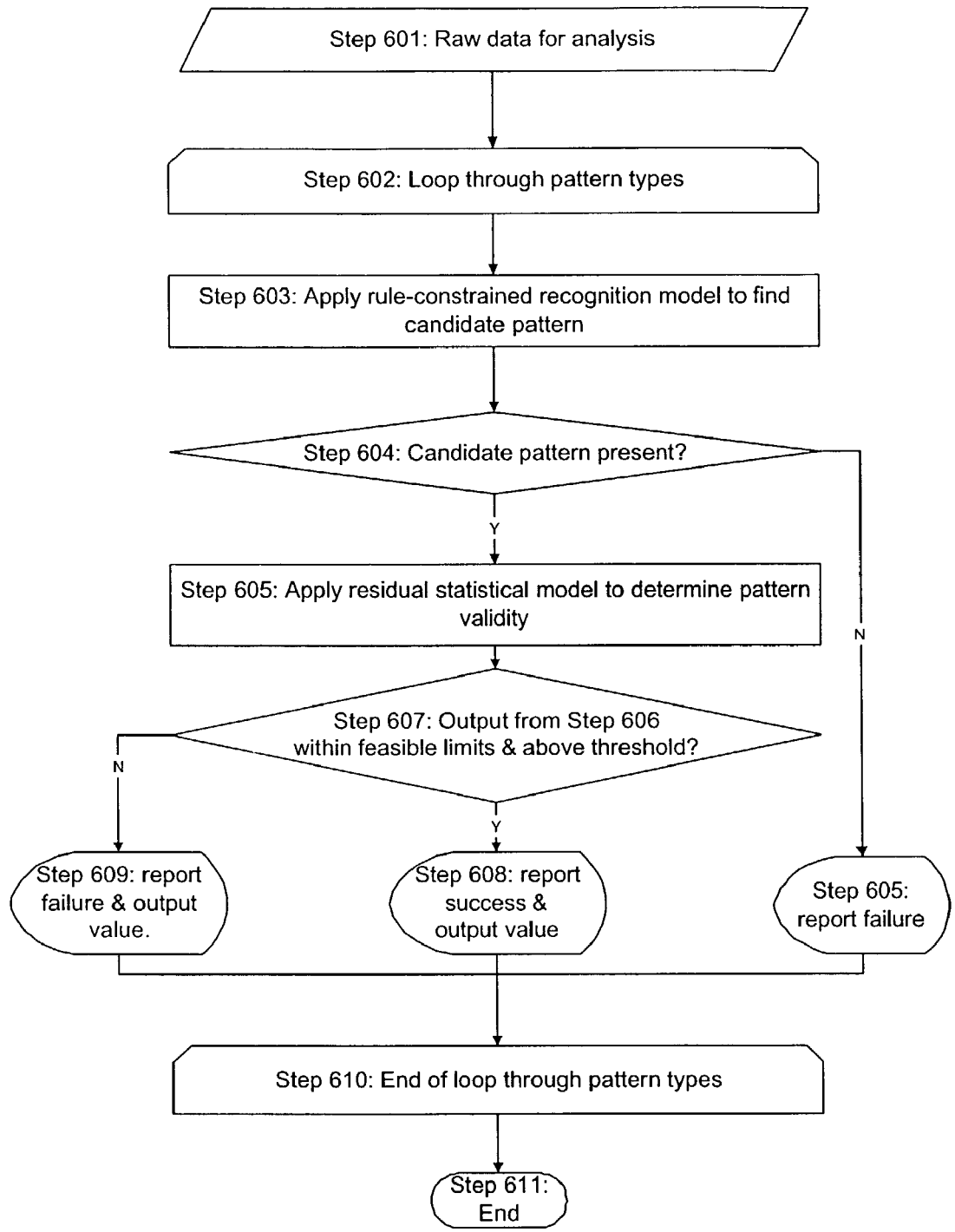
FIG. 6 illustrates the use of a constrained statistical pattern recognition model.

Referring to the flowchart of FIG. 6, the use of a rule-constrained statistical pattern recognition model, according to the present invention, to recognise the existence of a pattern in new data has the following steps:

Step 601. Prepare the raw input data needed by the rule-constrained statistical pattern recognition model.

Step 602. Steps 603 to 609 need to be carried out for each pattern type.

Step 603. For the pattern in question, its rule-constrained recognition model is applied to find out if a candidate pattern is present.

Step 604. This is a decision diamond to test whether or not a candidate pattern has been produced from step 603.

Step 605. If step 604 reports that no candidate pattern is present, the failure is reported in step 605.

Step 606. If step 604 reports that a candidate pattern is present, the inputs for the residual statistical model (which may include features of the candidate pattern) are prepared and the model applied. Its output is then fed to step 607.

Step 607. This step is a decision diamond to assess whether the output from step 606 is within feasible limits and above a relevant threshold.

Step 608. If the result of step 607 is positive, the existence of the pattern is reported, together with the output value.

Step 609. If the result of step 607 is negative, in this manifestation the failure to recognize the pattern and the output value from step 606 are reported. (Note: Further processing may be needed if the output from step 606 is above the threshold but outside feasible limits.)

Step 610. This is the end of the loop through possible pattern types.

Step 611. This is the end of the method.

Generally, if the output of a residual statistical model is above its threshold, the pattern is deemed to exist. There are sometimes quirks in the mathematical representation of the training data that require feasibility thresholds to be introduced for output values. Typically, these are needed when training data is inadequate, or unrepresentative, and a novel pattern is presented to the model that lies outside the region of input space for which training data was available. When feasibility thresholds are used, if the outputs are too high or low, uncertainty is assumed. This is also an added benefit, because when the pattern is outside of the threshold, an automatic trigger is available to indicate that the pattern should be added to a training data set to be used in retraining of the neural net once an adequate sample size has been achieved.

Where more than one pattern has been identified any conflict needs to be resolved. This is the situation that normally exists in statistical models. Where the recognition rules are exclusive, in the sense that it is not possible for multiple patterns to exist simultaneously, no conflict exists. Where multiple patterns are possible and the benefits and misclassification costs equal, the pattern with the highest-output statistical model might be chosen. Final resolution of multiple patterns with unequal benefits and misclassification costs depend on an examination of costs and other consequences.

Figure 12:
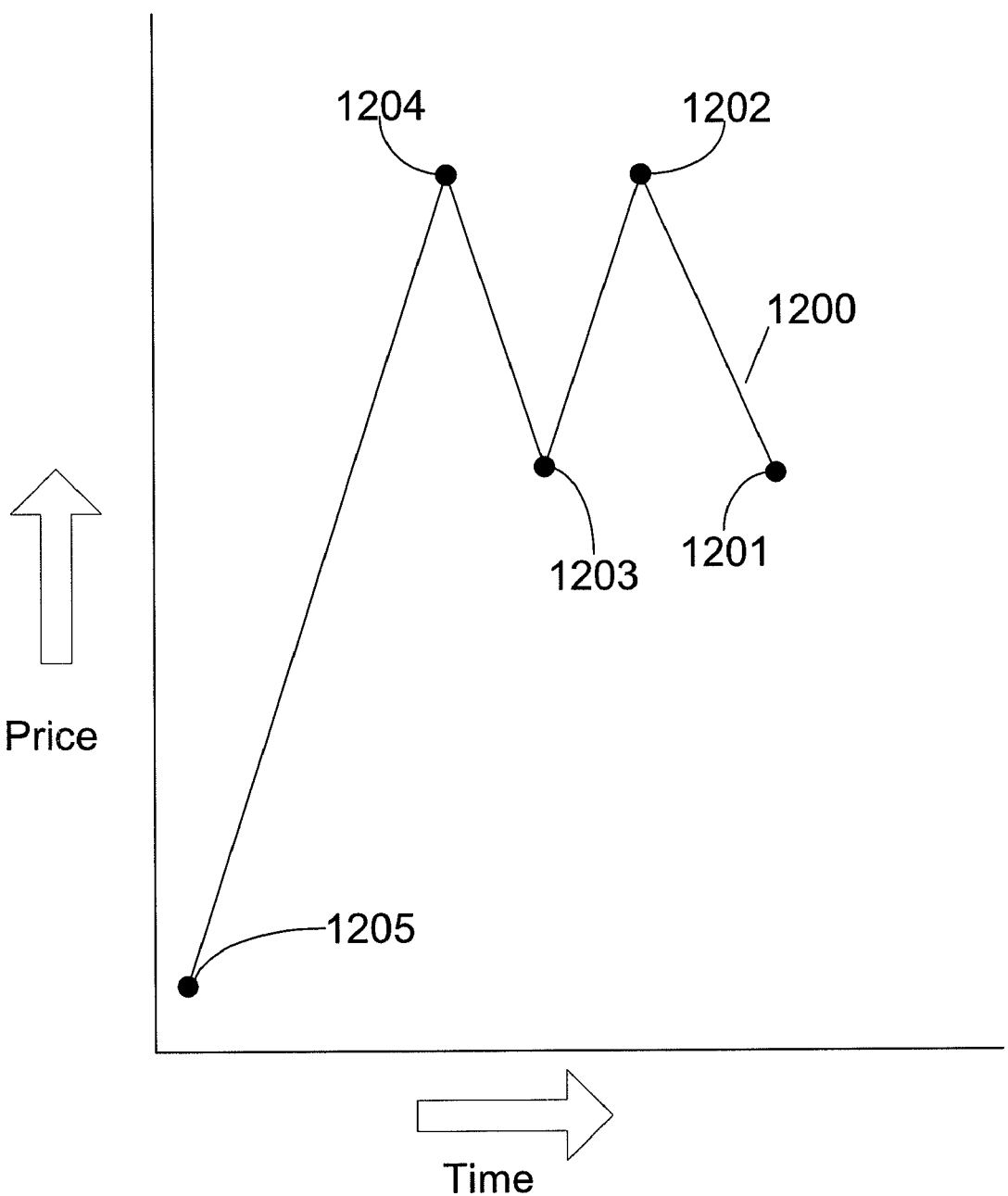
FIG. 12 illustrates a candidate double top for analysis according to a method of the present invention.

Rule-constrained statistical pattern recognition can be used to recognize a pattern in a security price chart. The present invention is more particularly illustrated by the example of a pattern known as a double top. Such a pattern is of interest to technical analysts who use them to judge when prices are about to fall. Referring to FIG. 12, in the graph 1200, double tops occur after up trends (starting from 1205), and consist of a peak 1204, trough 1203 and peak 1202, followed by a fall in price below the trough 1201.

Figure 13:
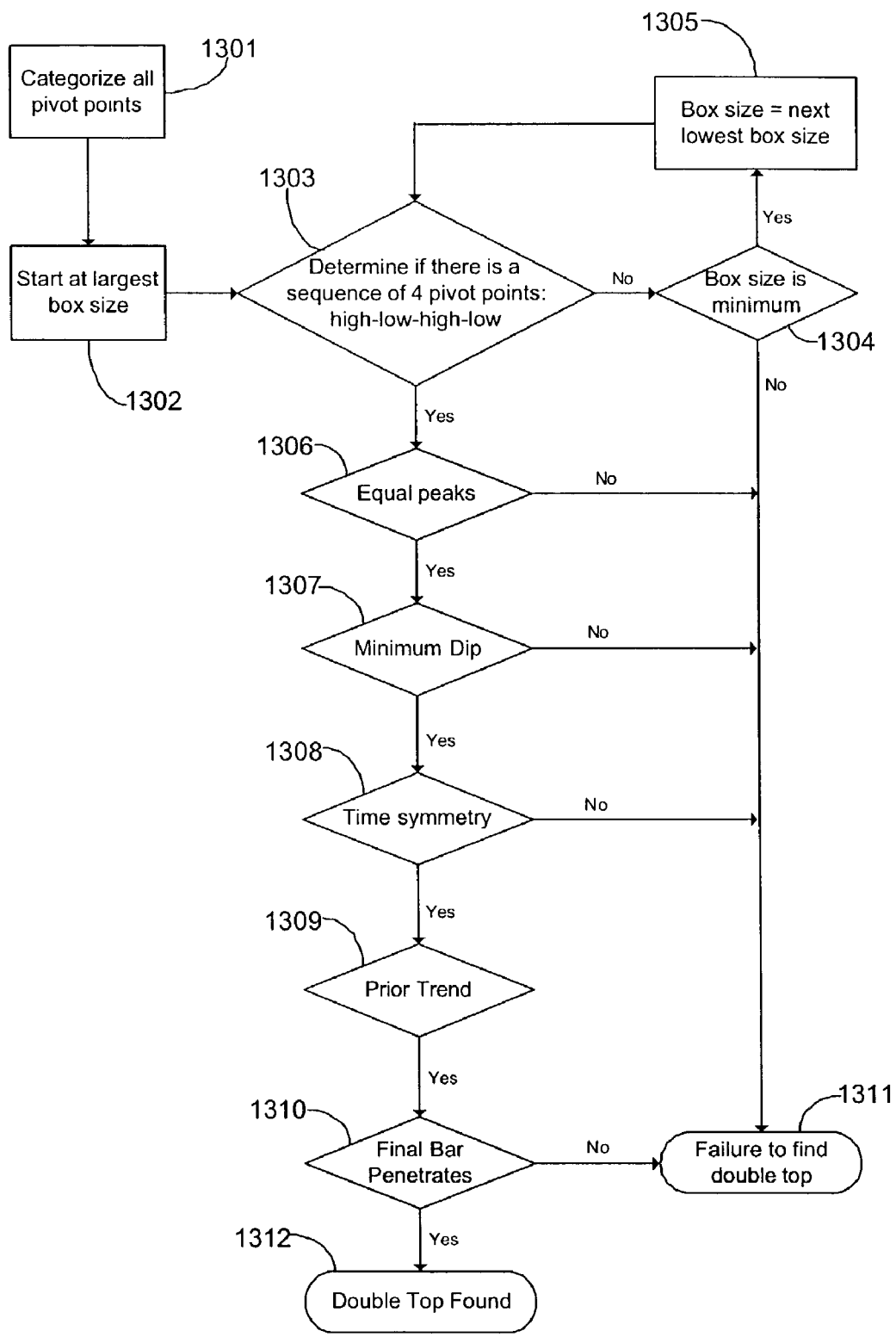
FIG. 13 illustrates an example method of recognizing a double top candidate.

Referring to FIG. 13, the following (loosely specified) algorithm can be used to recognize a double top candidate:

Step 1301: Categorize all pivot points, so that they have a lag and box size index associated with them in accordance with a method for categorizing pivot points in technical analysis.

Steps 1302 to 1303: Starting with the largest categorized box size, and looking backwards from the end of the series, see if there is a sequence of four turning points, high, low, high and low, for this box size. If there is, proceed to step 1306, if not to step 1304.

Steps 1304 to 1306: Starting with the next lowest box size, see if there is a sequence of four turning points of that box size or higher. If so proceed to Step 1306. If not, repeat this step until it either succeeds or the minimum box size is reached. If minimum box size is reached, and the sequence of turning points sought still not found, then recognition fails (Step 1311).

Step 1306: Comparable heights of peaks: values of the two peaks are compared to check that they lie within a pre-defined tolerance. If not, recognition fails (Step 1311).

Step 1307: Minimum dip: values of the two peaks (1202 and 1204) are averaged (average peak). The difference between the average peak and the central trough 1203 is calculated. This is called the dip. If it lies below an acceptable minimum, recognition fails (Step 1311).

Step 1308: Prior trend: if, within some prior search period, prices have not come from a low which is at least equal to the average peak less some predefined multiple of the dip, without having risen above the average peak before entering the formation, recognition fails (Step 1311).

Step 1309: Time asymmetry: if the difference in lags between the two peaks, less the difference in lags between the central trough and final bar, is greater than a pre-defined maximum, recognition fails (Step 1311).

Step 1310: Penetration: if previous steps have succeeded, then the final check is to see that either the low or close of the final bar penetrates below the level of the trough by some pre-defined minimum, for the first time. If it does, a candidate double top is recognised (Step 1312) otherwise, there is no double top candidate (Step 1311).

These rules alone do not always define double top formations that experts find satisfactory. Consequently, a series of candidate double tops resulting from this algorithm can be submitted for expert review. The results are "labelled" to say whether they are valid (1) or invalid (0). In addition, comments are received which indicate points of concern. These lead to a number of features being incorporated in the residual statistical model used by the RBF neural net module 214.

For example, referring to FIG. 12 for the double top residual statistical model, input variables consist of:

1. The gradient of the inbound trend, calculated by linear regression between points 1205 and 1204.
2. An $r^2$ value derived from the linear regression of the inbound trend between points 1205 and 1204.
3. A scaled price difference between points 1204 and 1205.
4. Ratios of prices at various points in the formation to the final value meaning prices 1205 to 1201, 1204 to 1201, 1203 to 1201, and 1202 to 1201.
5. Ratios of volumes at various points in the formation to the final value.
6. Time lags from the end for points 1202, 1203 and 1204.
7. Market "stochastic" variables to indicate where prices for points 1201 to 1204 in the formation are in relation to preceding prices.

These input variables, together with their related expert-labelled (validity) targets, are used to train a Bayesian-regularised RBF neural net module 214 in FIG. 2 to form the residual statistical model (see, e.g., Bishop). In practice, the rule-constrained model is applied to price records. If a candidate formation is found, the inputs are prepared and the residual statistical model applied to them. By inspection, if the output of the residual statistical model was found to be greater than 0.4, the double top formation was accepted.

It was mentioned earlier that with respect to rules for formations, individual technical analysts have discovered their own heuristics which are fiercely defended and produced a situation where they might agree on a core set of rules, but have their own ideas as to what additional rules constitute a formation. Consequently candidate formations derived from an under specified rule-based model (such as the first component of a rule-constrained statistical pattern recognition model) can be further evaluated with custom recognition rules. An important aspect of the present invention is therefore its extension to include user preferences.

"Customisation", or the use of filters such as filters 224 shown in FIG. 2, is essentially the process of allowing customer-specific rules to be introduced as a means of identifying specific sub groups of formations that comply. Customisation can include the output from a residual statistical model, which, since it is based on the experience of the people who labelled the data, will be referred to as the experiential rating.

Referring to FIGS. 7-11, we present filters in the context of illustrative examples of patterns. For all patterns we will use the Close Confirmation Rule which states that the close on the day of confirmation must break the resistance line, not just the intra-day extreme.

Figure 7:
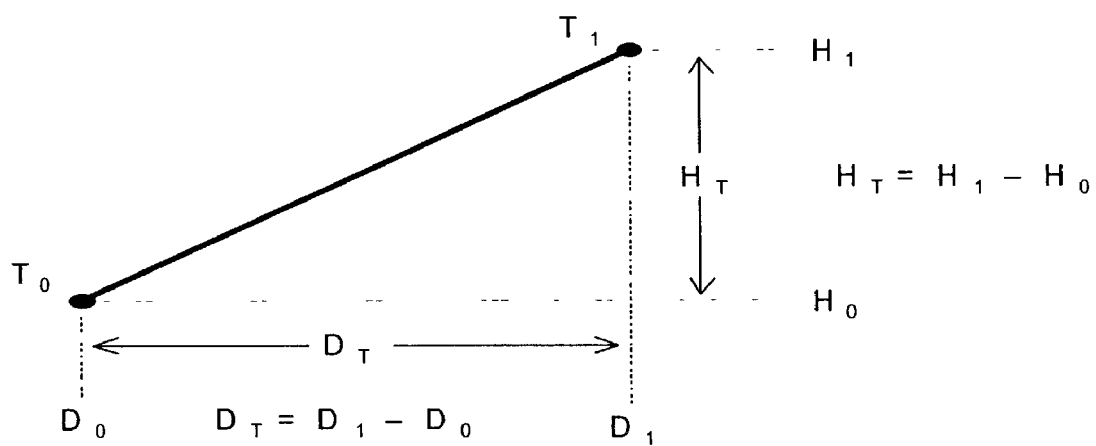
FIG. 7 illustrates quantities used in trendline analysis.
Figure 8:
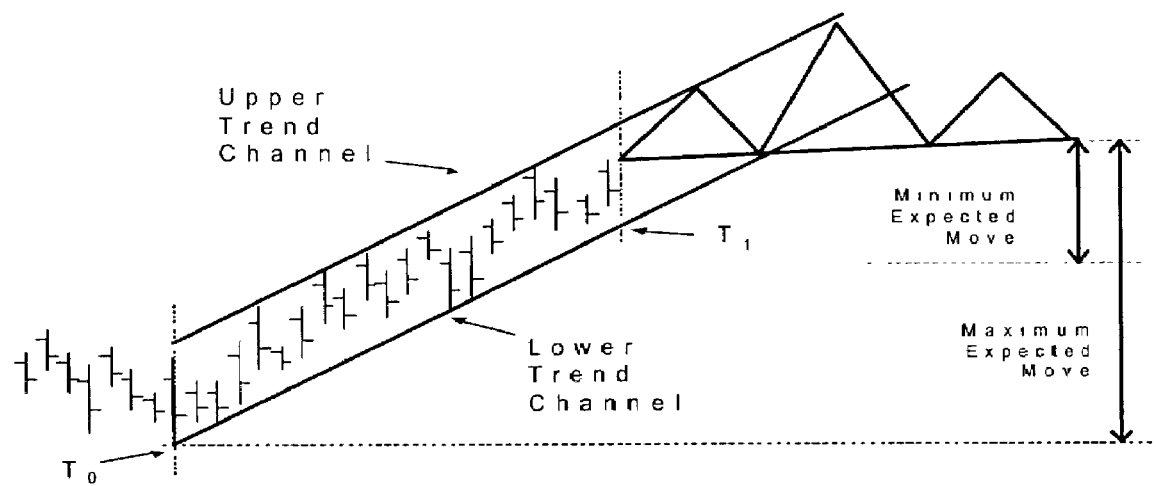
FIG. 8 illustrates terms used in trendline and neckline analysis.

Referring to FIGS. 7 and 8, the following calculations and metrics apply to trendline analysis and neckline analysis. The Height of the trend ($H_T$) is the difference between the Height of the end-point of the trendline ($H_1$) and the Height of the start-point ($H_0$). $H_T$ can be positive (an uptrend), negative (a downtrend) or zero (a flat trend with $H_1 = H_2$). Bottom patterns should use the Upper Trend Channel line for height and duration calculations. Top patterns should use the Lower Trend Channel line for height and duration calculations.

The Duration of the trend ($D_T$) is the number of price bars difference between the end-point ($D_1$) and the start-point ($D_0$). $D_T$ must always be a positive integer. Bottom patterns should use the Upper Trend Channel line for height and duration calculations. Top patterns should use the Lower Trend Channel line for height and duration calculations.

For all bottom patterns the trend must be negative. For all top patterns the trend must be positive. For all patterns the height of the trend ($H_T$) represents the Maximum Expected Move. The height of the pattern ($H_P$), as shown in FIG. 9, represents the Minimum Expected Move.

Figure 9:
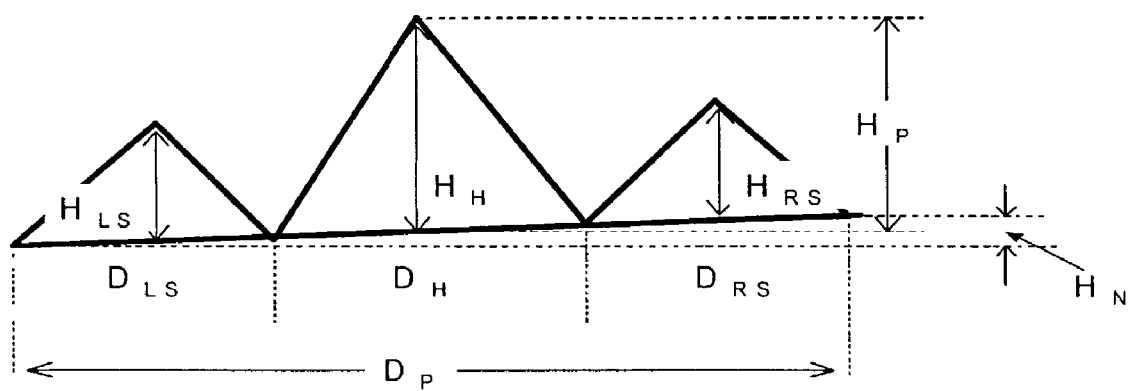
FIG. 9 illustrates relationships for a head and shoulders formation.

Referring to FIG. 9, the neckline of the head and shoulders formation should have the same metrics as a trendline. The height of the neckline ($H_N$) can be positive or negative, but the absolute value of the height of the neckline must be less than 30% of the absolute value of the height of the pattern ($H_P = H_H$).

$$|H_N| \leq |0.3 \times H_P|$$

Each of the shoulders must fall between 50% and 80% of the height of the head.

$$0.5 \times H_H \leq H_{LS} \leq 0.8 \times H_H$$

$$0.5 \times H_H \leq H_{RS} \leq 0.8 \times H_H$$

Certain duration relationships should also exist. The minimum duration for a Head and Shoulders pattern is 20 periods. In addition the duration of the inbound trend must also equal or exceed 20 periods.

$$D_P \geq 20$$

$$D_T \geq 20$$

In addition, the durations of the shoulders must be between 20% and 40% of the duration of the pattern.

$$0.2 \times D_P \leq D_{LS} \leq 0.4 \, D_P$$

$$0.2 \times D_P \leq D_{RS} \leq 0.4 \, D_P$$

The volume must also be considered. There are three measures for volume. The condition for passing the volume test is that all three of the following tests should be true.

(1) A least-squares fit line to the volume between the left edge of the left-shoulder to the right-edge of the right shoulder should have a negative slope. (i.e. the line should fall to the right).

(2) The maximum volume appearing in the left shoulder must exceed the maximum volume during the head which must exceed the maximum volume over the right shoulder.

$$V_{LS} > V_H > V_{RS}$$

(3) It may be desirable to use the average volume or a centre-weighted average to calculate the volume measure for the left shoulder, head and right shoulder rather than just the maximum volume in the period. There should be a volume spike on the day of confirmation. The volume spike should exceed the moving average of the volume over the previous Dp/4 periods.

Figure 10:
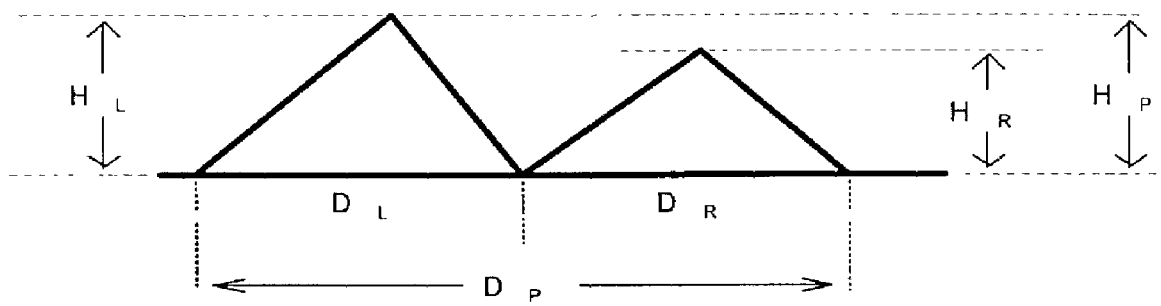
FIG. 10 illustrates relationships for a double top formation.

Referring to FIG. 10, the proper height relationship should exist in a double top pattern. The absolute value of the difference between peak heights cannot exceed 20% of the pattern height ($H_P$).

$$|H_R - H_L| \leq 0.2 \times H_P$$

The minimum duration for a double pattern is 12 periods. In addition, the minimum duration for the inbound trend must be 12 periods.

$$D_P \geq 12$$

$$D_T \geq 12$$

The difference between the durations of each peak must not exceed 20% of the duration of the pattern.

$$|D_R - D_L| \leq 0.2 \times D_P$$

There are three measures for volume. The condition for passing the volume test is that all three tests should be true:
(1) A least-squares fit line to the volume between the left edge of the left-peak to the right-edge of the right peak should have a negative slope. (i.e. the line should fall to the right).
(2) The maximum volume appearing in the left peak must exceed the maximum volume over the right peak.

$$V_L > V_R$$

(3) It may be desirable to use the average volume or a centre-weighted average to calculate the volume measure for the left and right peaks rather than just the maximum volume in the period. There should be a volume spike on the day of confirmation. The volume spike should exceed the moving average of the volume over the previous Dp/2 periods.

Figure 11:
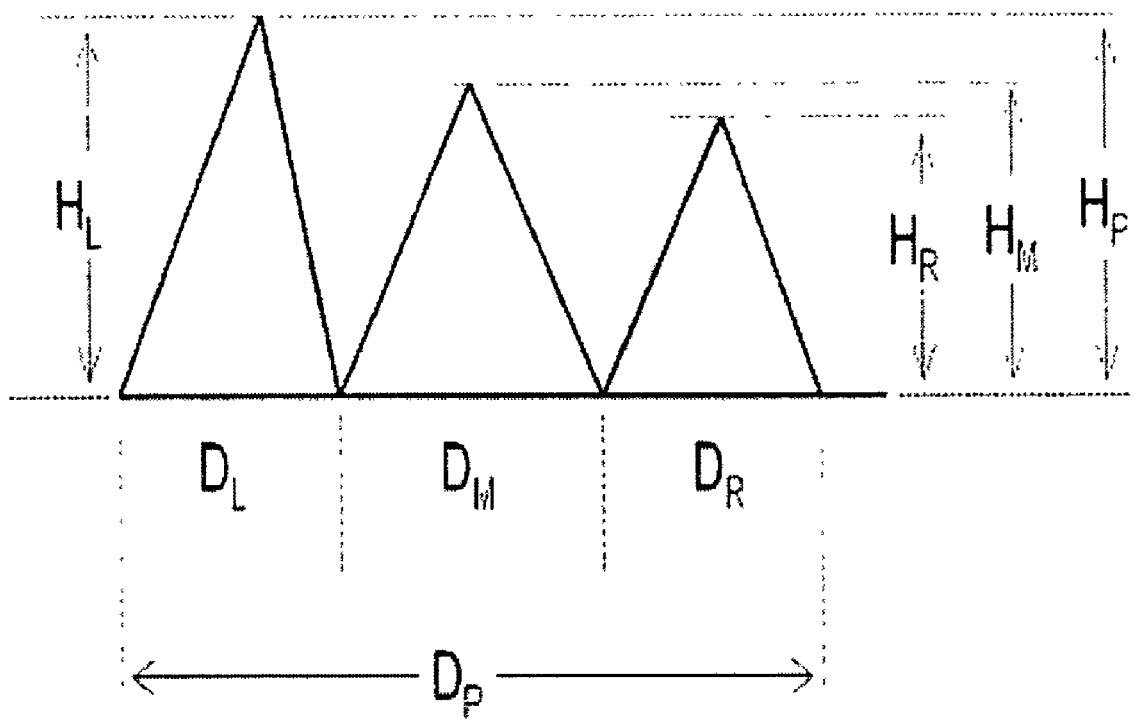
FIG. 11 illustrates relationships for a triple top formation.

With reference to FIG. 11, we now consider the case of triple tops. The absolute value of the difference between the lower two peaks cannot exceed 20% of the maximum height of the pattern ($H_P$).

If $H_L = H_P$ then $|H_M - H_R| \leq 0.2 \times H_P$  Case 1

If $H_R = H_P$ then $|H_M - H_L| \leq 0.2 \times H_P$  Case 2

If $H_M = H_P$ then $|H_R - H_L| \leq 0.2 \times H_P$  Case 3

With respect to duration, the minimum duration for a triple top pattern is 18 periods. In addition, the minimum duration for the inbound trend is also 18 periods.

$$D_P \geq 18$$

$$D_T \geq 18$$

The durations of each peak must be between 20% and 40% of the duration of the pattern ($D_P$).

$$0.2 \times D_P \leq D_L \leq 0.4 D_P$$

$$0.2 \times D_P \leq D_R \leq 0.4 D_P$$

$$0.2 \times D_P \leq D_M \leq 0.4 D_P$$

There are three measures for volume. The condition for passing the volume test is that all three tests should be true:
(1) A least-squares fit line to the product of the price change and the volume change (dP·dV) between the left edge of the left-peak to the right-edge of the right peak should have a negative slope. (i.e. the line should fall to the right).
(2) The maximum volume appearing in the left peak must exceed the maximum volume of the middle peak which must exceed the maximum volume over the right peak.

$$V_L > V_m > V_R$$

(3) It may be desirable to use the average volume or a centre-weighted average to calculate the volume measure for the three peaks rather than just the maximum volume in the period. There should be a volume spike on the day of confirmation. The volume spike should exceed the moving average of the volume over the previous Dp/4 periods.

Figure 14:
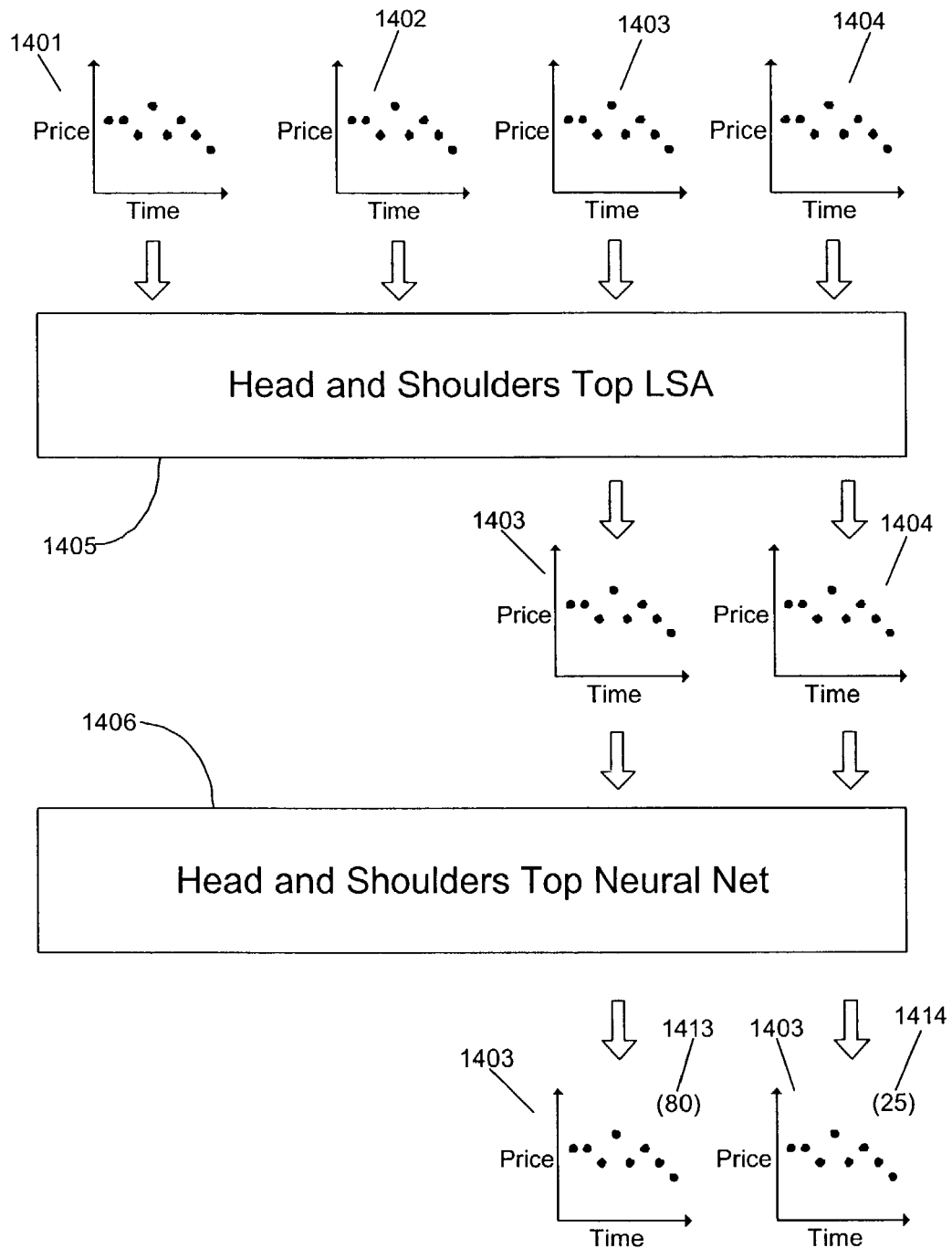
FIG. 14 illustrates the identification of head and shoulder top candidates using a loosely specified algorithm and a neural net.

In summary, as shown in FIG. 14, the present invention functions as follows. Data, which can be charted as shown in charts 1401 to 1404, is fed to LSAs 1405. The LSA 1405 is configured, for example, to identify head and shoulders top formations. LSA 1405 is under-constrained and allows false positives while eliminating or minimizing false negatives. In the example of FIG. 14, only the data corresponding to charts 1403 and 1404 are identified as candidates containing a head and shoulders top pattern. Of course, other patterns can be substituted and the LSA 1405 need not be restricted to identifying candidates corresponding to a single pattern. The LSA 1405 in the example rejects data 1401 and 1402 but identifies data 1403 and 1404 as possible head and shoulders top formation candidates. These candidates are fed to a neural net 1406 configured to identify head and shoulder top formations. The neural net 1406 can, for example, take the form of a radial basis function as shown in FIG. 2. The neural net 1406 in the example assigns ratings 1413, 1414 indicating how well the candidate matches an idealized head and shoulders top pattern. The candidates 1403 and 1414 are stored in a database along with their respective values. The candidates need not be restricted to a single pattern but can be candidates for more than one pattern. This value can be used later, for example, by a filter to select only strong candidates for review.

As will be appreciated by those skilled in the art, the above described invention is not limited to financial and technical analysis. One skilled in the art will readily appreciate that the present invention is equally applicable to fields such as medical diagnostics, engineering analysis, information theory, and other fields that utilize predictive techniques.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A rule constrained statistical recognition system for determining rated pattern candidates from time-series data, the system comprising:
   a processor;
   a rule constrained recognition module for identifying pattern candidates, corresponding to a predetermined pattern, in the time-series data, using under-constrained recognition models to include all true positives while minimizing or eliminating false negatives;
   a residual statistical module for identifying each pattern candidate as valid or invalid using residual statistical models and for rating each valid pattern candidate;

storage means for storing the rated pattern candidates; and
a user interface for displaying the rated pattern candidates.

2. The system of claim 1, further comprising a characterization module for identifying characteristics of each pattern candidate and wherein the storage means comprises means for storing pattern candidates and each candidate's identified characteristics.

3. The system of claim 2, further comprising means for conducting technical analysis on the time-series data.

4. The system of claim 2, further comprising a filter for excluding pattern candidates based on the identified characteristics.

5. The system of claim 2, further comprising a filter for validating pattern candidates based on the identified characteristics.

6. The system of claim 1, wherein the storage means stores each rated pattern candidate that is outside a feasibility threshold limit for retraining of the residual statistical module.

7. The system of claim 1, wherein the residual statistical module is a radial basis function neural net module.

8. The system of claim 1, further comprising at least one of:
a training module, a genetic algorithm parameter tuning module, a genetic algorithm feature selection module, and a Bayesian regularizer module for training the rule constrained recognition module or the residual statistical module.

9. A computer-implemented method of rule constrained statistical pattern recognition for determination of predetermined patterns in time-series data, the method comprising:
using an under-constrained rule constrained recognition model to identify pattern candidates by including all true positives while minimizing or eliminating false negatives;
identifying each pattern candidate as valid or invalid using residual statistical models;
assigning a rating to each valid pattern candidate;
determining the characteristics of each pattern candidate;
filtering the resulting rated pattern candidates to exclude pattern candidates based on the pattern candidate's characteristics; and
displaying the rated pattern candidates on a user interface.

10. A computer-implemented method of training a rule-constrained statistical pattern recognizer, the method comprising:
assembling data for input space of recognition model, the data including examples of pattern types to be recognized;
establishing recognition rules;
generating, using the recognition rules, an under-specified rule-constrained recognition model to include all true positives while minimizing or eliminating false negatives;
applying the rule-constrained recognition model to the assembled data to produce candidate patterns;
identifying features of candidate patterns for use in a statistical model to assess validity of different candidate types;
generating, for each pattern type, a residual statistical model based on the candidate pattern identified as valid; and
training the rule-constrained statistical pattern recognizer using the generated rule constrained recognition model and the residual statistical model to recognize price formation.

11. The method of claim 10, wherein the recognition rules are mandatory rules.

12. The method of claim 10, wherein the step of identifying candidate patterns comprises labeling each candidate pattern as being valid or invalid.

13. The method of claim 10, further comprising applying a filter to each pattern type.

14. The method of claim 13, wherein applying the filter comprises ensuring that duration relationships are respected.

15. The method of claim 13, wherein applying the filter comprises ensuring that height relationships are respected.

16. The method of claim 13, wherein applying the filter comprises ensuring that volume requirements are met.

17. A rule constrained statistical recognition system for determining rated pattern candidates from data, the system comprising:
a processor;
a rule constrained recognition module for identifying pattern candidates, corresponding to a predetermined pattern, in the data, using under-constrained recognition models to include all true positives while minimizing or eliminating false negatives;
a residual statistical module for identifying each pattern candidate as valid or invalid using residual statistical models and for rating each valid pattern candidate;
storage means for storing the rated pattern candidates; and
a user interface for displaying the rated pattern candidates.

* * * * *